US007892310B2

(12) United States Patent
Le

(10) Patent No.: US 7,892,310 B2
(45) Date of Patent: Feb. 22, 2011

(54) BIOWASTE TREATMENT

(75) Inventor: Son Le, Warrington (GB)

(73) Assignee: United Utilities PLC, Great Britain (GB)

( * ) Notice: Subject to any disclaimer, the term of this patent is extended or adjusted under 35 U.S.C. 154(b) by 38 days.

(21) Appl. No.: 11/988,348

(22) PCT Filed: Jul. 4, 2006

(86) PCT No.: PCT/GB2006/002479

§ 371 (c)(1),
(2), (4) Date: Jan. 4, 2008

(87) PCT Pub. No.: WO2007/003940

PCT Pub. Date: Jan. 11, 2007

(65) Prior Publication Data

US 2009/0139289 A1    Jun. 4, 2009

(30) Foreign Application Priority Data

Jul. 5, 2005  (GB) ................... 0513680.9
Sep. 28, 2005 (GB) ................... 0519735.5

(51) Int. Cl.
*A62D 3/02* (2007.01)
*C05F 11/08* (2006.01)
*C05F 3/00* (2006.01)
*C05F 7/00* (2006.01)

(52) U.S. Cl. .............. 71/10; 71/12; 71/15; 71/25; 71/903; 119/6.7; 435/262.5

(58) Field of Classification Search ............ 71/10; 435/262.5

See application file for complete search history.

(56) References Cited

U.S. PATENT DOCUMENTS 6,368,849 B1 * 4/2002 Norddahl ................. 435/262
7,311,834 B2 * 12/2007 Lee, Jr. ..................... 210/603

FOREIGN PATENT DOCUMENTS

| CA | 2098932  | A  | 12/1994 |
|----|----------|----|---------|
| CA | 2258254  | A  | 6/2000  |
| DE | 288141   | A5 | 3/1991  |
| DE | 19518234 | A  | 3/1996  |
| JP | 58150497 | A  | 9/1983  |
| RU | 2214989  | C1 | 10/2003 |

OTHER PUBLICATIONS

Search Report—Application No. GB 0513680.9.

* cited by examiner

*Primary Examiner*—Wayne Langel
(74) *Attorney, Agent, or Firm*—Wood, Phillips, Katz, Clark & Mortimer

(57) ABSTRACT

A method of treating bio waste including the steps of (1) fermenting substantially raw biowaste in a pathogen reduction stage under anaerobic conditions for a predetermined period at a temperature in the mesophillic temperature range and (2) subsequently separating the solid and liquid phases to produce a fermented cake and fermented liquor. The fermented cake has at least 15% solids on dry basis and contains over 500 mg/L ammonia, over 1,000 mg/L total Volatile Fatty Acids (tVFA) and *Escherichia coli* less than 100,000 cfu per g dry solids. The fermented liquor contains over 10,000 mg/L COD, over 500 mg/L ammonia, over 1,000 mg/L tVFA and less than 5,000 mg/L of suspended solids.

19 Claims, 1 Drawing Sheet

BIOWASTE TREATMENT

The present invention relates to products and processes associated with the treatment of biowastes such as sewage sludge and animal wastes.

Sewage sludge is the material that settles out during the treatment of municipal wastewater, which typically comprises domestic sewage and wastewater of industrial origin.

Animal wastes typically arise from animal feeding operations (AFO) on farms or feedlots where animals are kept and raised in confined areas. AFO cluster animals, feed, manure and urine, and production operations on a small land area. Feed is brought to the animals rather than the animals grazing in pastures, fields, or on rangeland. Common types of AFO include dairies, cattle feedlots, poultry and pig farms. Pollution associated with AFO degrades the quality of waters, threatens drinking water sources, and may harm air quality. However, if properly treated and used, manure from animal feeding operations can be a valuable resource.

Biowastes are widely used in the agricultural industry as a source of fertiliser and soil conditioner. To render the wastes suitable for such use they must first be treated both to reduce their pathogen content and to stabilise the materials by reducing their organic content. The most common method for such treatment is a mesophillic anaerobic digestion process, often abbreviated as MAD. Traditionally, the MAD process is typically carried out in two stages, namely a primary digestion phase at 35° C. lasting 12 to 24 days followed by a 14 day storage. Primary digestion converts a proportion of the organic content to methane. Storage causes the pathogen level to be reduced. The digested biowastes are often dewatered to produce a cake in order to reduce the cost of stockpiling and transportation.

The disadvantages of the traditional MAD process include the fact that it is very slow and its pathogen reduction capability is very limited. Previously, this Applicant has disclosed an incubation treatment of sludge for pathogen reduction prior to digestion (UK 0126963.8 Nov. 9, 2001) that gave improved pathogen reduction capability and obviated the need for a storage phase. However, the overall treatment time of the improved process was still considerably long. Furthermore, regardless of the digestion methods employed, all digested sludge products show a tendency to support the re-growth of pathogens such as *Escherichia coli* and generate foul odour if they were subjected to an intense shear field such as they would experience during a dewatering process with a centrifuge.

Additionally, problems arise with the level of phosphate in wastewaters. In Europe the Urban Waste Water Treatment Directive (UWWTD, 91/271/EEC) sets down minimum standards for the discharge of effluent. The Regulations apply to all discharges whether to inland surface waters, groundwater, estuaries or coastal waters. Standards are generally based on BOD, SS, N and P with levels to be met being dependent on size of population served and whether the receiving waters are classified as normal, sensitive or less sensitive. Whilst there are well-established methods for removal of BOD, SS and N from wastewaters, current solutions for P removal are less acceptable. In most instances, operators rely on the use of iron salts for this application. Amongst the many serious drawbacks with iron salts include supply shortage, harmful effects of residual iron to the aquatic environment, and the substantial increase in sludge production resulting from ferric use that would require disposal. The ferric phosphate resulting from the process is not bio-available and therefore has little agricultural value. A more desirable alternative is the biological phosphorus removal process (BNR), a well-known technique that is based on the activity of polyphosphate (poly-P) accumulating organisms under anaerobic condition. Poly-P accumulation is highly dependent on the fermentation of the complex carbon source into volatile fatty acids (VFA). Typically, the additional soluble organic matter would be generated from the internal carbon source of the sewage by fermentation either in an anaerobic zone of the sewage treatment plant; or in a dedicated pre-fermenter.

VFA production can be attributed to fermentation of the sludge or the settleable solids in sewage. In general sludge is able to produce significant increases in VFA concentration, with better results being obtained from primary sludge than the mixed sludge. Most full-scale prefermenters are fed with primary sludge. These prefermenters are called "side-stream prefermenters". Primary sludge is the concentrated underflow of a primary clarifier and is sometimes also called raw sludge. The so-called "in-line prefermenters" are fed with raw sewage rather than with primary sludge. An example of an in-line prefermenter is the activated primary tank (APT). APT produces VFA by allowing a sludge blanket to form in the primary clarifier. Fermentation and VFA production then take place in this sludge blanket. The sludge is recycled back to the inlet and this recycling process is supposed to inoculate the incoming solids with actively fermenting organisms, elutriate the VFA formed in the sludge blanket. These known VFA production systems for BNR operate with unthickened sludge at ambient temperature. The drawbacks with such systems include their large volumes and low VFA production rates. The sludge fraction resulting therefrom is also unsuitable for agricultural recycling without further treatment, for example by digestion or composting. Furthermore, the VFA from these sources are invariably contaminated with a high level of P that is released from the sludge during fermentation. The presence of P in the VFA makes them less efficient for BNR application. All these factors, combined with the normally weak sewage as found in many European countries such as the UK, means that it is not possible to achieve satisfactory BNR, especially for P removal. An external carbon source, which could be VFA, but also methanol, ethanol, or wastewater with a high soluble COD concentration, e.g. from a food processing factory, is often the only certain method of achieving consistent plant performance.

It is an object of the present invention to obviate or mitigate the above disadvantages.

Figure 1:
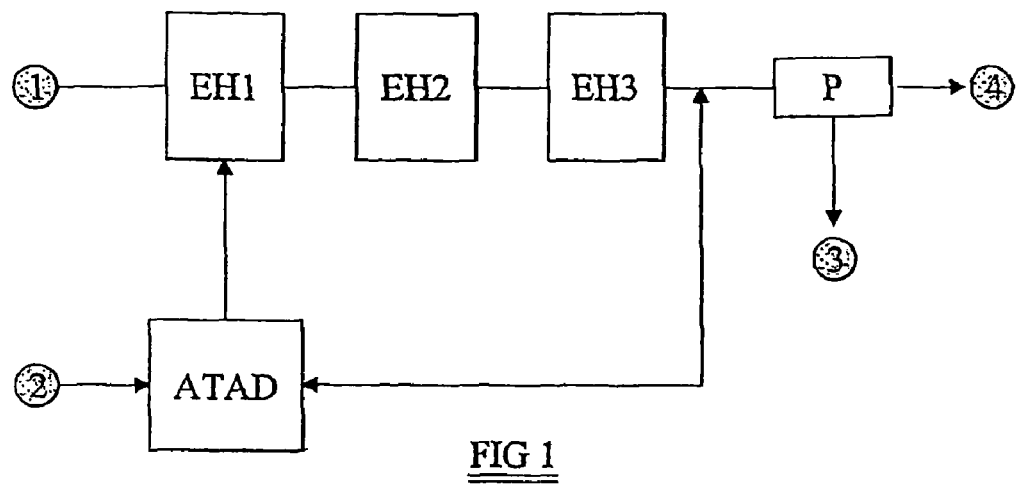
FIG. 1 is a flow diagram representation of one method of treating biowaste, according to the invention, utilizing three fermentation vessels in series.

Accordingly, a first aspect of the present invention provides a method of treating biowaste comprising the steps of (1) fermenting the biowaste in a pathogen reduction stage under anaerobic conditions for a predetermined period at a temperature in the mesophillic temperature range and (2) subsequently separating the solid and liquid phases to produce a fermented cake and fermented liquor.

A second aspect of the present invention provides a fermented cake of biowaste origin with at least 15% solids on dry basis that contains over 500 mg/L ammonia, over 1,000 mg/L total Volatile Fatty Acids (tVFA) and *Escherichia coli* less than 100,000 cfu per g dry solids.

More preferably, the cake has at least 20% solids on a dry basis, especially being in the range 20%-45%. Preferably, the cake contains over 1000 mg/L ammonia, more preferably 1500 to 3500 mg/L. The tVFA content of the cake is preferably at least 3000 mg/L, more preferably 5000-25000 mg/L with *Escherichia coli* being present in amount less than 10,000 cfu per g dry solids, more preferably less than 1000.

A third aspect of the present invention provides a fermented liquor of biowaste origin that contains over 10,000 mg/L COD, over 500 mg/L ammonia, over 1,000 mg/L tVFA and less than 5,000 mg/L of suspended solids.

It is preferable for the fermented liquor to contain at least 20,000 mg/L COD, preferably being in the range 20,000 to 40,000. The liquor preferably contains at least 1500 mg/L of ammonia, ideally being in the range 1500-3500 mg/L and has a tVFA content of at least 3000 mg/L, preferably being in the range 5000-25000 mg/L. The suspended solids in the liquid is preferably less than 3000 mg/L.

It is to be appreciated that the fermented cake and liquor according to the second and third aspects of the present invention are preferably produced by a method according to a first aspect of the present invention.

The pathogen reduction stage (step (i)) involves the fermentation of substantially raw biowaste, i.e. having no inoculums such as partially digested sludge, added to and/or mixed with the waste to seed it. Furthermore, in traditional mesophillic anaerobic digestion the waste is kept within the mesophillic range and seeded with partially digested sludge for a period in excess of 12 days. In contrast, with the present invention, the solid and liquid fractions of the fermented waste are immediately separated by mechanical means to produce a fermented cake and fermented liquor.

It will be understood that the term "biowaste" normally refers to a waste stream resulting from an industrial operation involving a biodegradable raw material and may contain harmful pathogens. Such wastes include for example, sewage sludge, farmyard slurries, abattoir wastes and wastes from other industrial processes. Moreover, the term "biowaste" is used to refer to a waste that has a relatively high organic content and does not exclude the possibility that there has been some degree of pre-treatment. Thus the term "biowaste" should be interpreted broadly as referring to a waste stream having a high organic content. Typically this will be a waste having a total Chemical Oxygen Demand (COD) greater than about 10,000 mg/l, although in practical applications the material of interest is likely to have a COD in the range 30,000 to 100,000 mg/L and a BOD (5 day) in the range 5,000 to 50,000 mg/L (the BOD indicating the biodegradability of the feed material). The original waste stream may have 1 to 40% solids and the remainder is water. The solids would be partly in a soluble form and partly in the suspended form. Preferably the solid level should be in the range of 3 to 15%. The solid level of the waste stream may be adjusted by any convenient means. For example, the waste stream may be diluted by a wastewater either before, during or even after the pathogen reduction stage. It has been found that dilution could improve the recovery of total volatile Fatty Acids. The waste stream should preferably be one with little or no significant pathogen content.

The mesophillic temperature range is understood to be from about 25° C. to about 46° C. In the present invention the preferred operating temperature range is between 32° C. and 42° C.

It has been found that a suitable fermentation period is from about 1 day to about 6 days. In the present invention the preferred fermentation period is between 2 days and 5 days. Thus, the period required for the preparation of a cake and liquor that are suitable for use as a valuable resource is greatly reduced by implementation of the method of the present invention.

Suitable solid liquid separation methods for the present invention include all known dewatering methods such as centrifugation, belt press and plate press. These processes often require pre-conditioning, for example with a coagulant and/or pH adjustment and thus the method of the invention may include a pre-conditioning step. The methods produce a cake with a solid content of 20% to 40% dry weight plus a liquor with a suspended solid content generally below 5,000 mg/L.

The process of the invention may be operated in a batch mode or continuously. Preferably, the process is operated in a continuous mode using a plurality of reactors in series in order to avoid pathogen bypass.

More preferably, a small proportion of the fermented waste is withdrawn from a reactor and air or oxygen is introduced into this fermented waste. The VFA present in the fermented waste is oxidized to carbon dioxide which produces heat that may be used to heat the biowaste in the pathogen reduction phase, thereby increasing the efficiency of the process of the present invention.

More preferably, at least 3 vessels are provided in series, especially 6, wherein a small proportion of fermented waste is removed from one or more vessels and used to heat one or more of the other vessels. The heat generated by the fermented waste may be removed by a heat exchanger and be recycled to one or more of the vessels. The oxidized fermented waste with the heat removed may then be combined with waste from one of the vessels, preferably the last in the series and be fed to a filter press.

Alternatively, oxygen or air may be added at intervals to one of the vessels, preferably the first, to generate heat.

During the fermentation process some bacteria species release enzymes to break down large molecules such as lipids, proteins and carbohydrates into smaller molecules which other bacteria are then able to utilise and ultimately result in the formation of ammonia, acetic acid and carbon dioxide. It has been found that the fermentation condition is such that dangerous pathogens such as *Escherichia coli* and *Salmonella* are not able to survive and are destroyed. Furthermore, provided that the fermented medium is not diluted, the fermented products did not show any tendency to support the re-growth of pathogens or to generate foul odour even if they were subjected to high shear rates such as during centrifugation.

It should be noted that although the fermented products do not have a tendency to generate foul odour, they do contain odorous residual chemicals such as mercaptan compounds that form during the fermentation process. Such compounds should normally be removed from the fermented cake before the product is recycled to the land as a fertiliser in order to avoid odour nuisance. Suitable methods for the treatment of cake odour include reactions with oxidising agents such as peroxide or chlorite. Alternatively, the odour could be removed through a natural composting process of the cake by simple exposure to air for a period over 2 days.

The present invention also provides a method for producing methane gas from the fermented sludge liquor. Suitable anaerobic digestion methods for the fermented liquor of the present invention include all known anaerobic digestion methods such as mesophillic anaerobic digestion and thermophillic anaerobic digestion in both suspended growth or fixed film systems. A fixed film system such as the Up-flow Anaerobic Sludge Bed (UASB) reactor is the preferred choice for the present invention due to its very short hydraulic retention time requirement.

Although the present invention provides a fermented cake suitable for use as a fertiliser or soil conditioner and a fermented liquor suitable for the production of methane, it will be appreciated that other uses for such products are possible. For example, the cake could be fed to worms in vermiculture or further treated by composting or drying to improve storage and handling. Further, the liquor may be used as a feedstock for the fermentation of other useful products such as biodegradable plastics. In all cases, for both fermented liquor and fermented cake, ammonia and tVFA levels over 1,500 mg/L and 3,000 mg/L respectively are preferred. The cake preferably has at least 20% solids on dry basis and *Escherichia coli* less than 10,000 cfu per g dry solids. The fermented liquor preferably has over 20,000 mg/L COD and less than 3,000 mg/L of suspended solids.

In a preferred embodiment of the present invention, the method further comprises the step of precipitating the orthophosphate contained within the fermented biowaste prior to separation of the solid and liquid phases. This provides a liquor with a high VFA concentration and low phosphate concentration.

Accordingly, a fourth aspect of the present invention provides a method for producing a liquor high in volatile fatty acids and low in phosphate contamination comprising the steps of (1) fermenting a biowaste under anaerobic conditions for a predetermined period at a temperature in the mesophillic temperature range (2) precipitating out orthophosphate contained within the biowaste and (3) subsequently separating the solid and liquid phases.

Orthophosphate is phosphorus in the form of soluble phosphate.

Any suitable precipitation method using a salt or metal oxide may be employed to cause precipitation of the orthophosphate, but preferably a magnesium salt, such as magnesium chloride or magnesium oxide is used in order to achieve struvite formation.

Preferably, the biowaste is thickened sewage sludge with more than 4% solids, ideally at least 5% solids.

The method according to the fourth aspect of the present invention produces VFA having over 5000 mg/L total VFA with less than 50 mg/L phosphate contamination, more preferably over 7500 mg/L total VFA with less than 15 mg/L P contamination.

Specific embodiments of the present invention will now be described, by way of examples only.

EXAMPLE 1

A bottle with 1 L capacity was filled with raw sewage sludge. After placing the lid on the bottle, it was left to ferment in a pathogen reduction step for 4 days at a temperature of 35° C. A sample of the fermented sludge was dewatered in a bench scale centrifuge to produce samples of fermented cake and fermented liquor.

The results of the experiment are summarised in Table 1 below:

TABLE 1

| | Sample of process material | | | |
|---|---|---|---|---|
| | Before pathogen reduction step | After pathogen reduction step | Fermented liquor | Fermented cake |
| Dry weight, % | 7.67 | 7.50 | | 20.30 |
| Suspended solids, mg/L | | | 1,200 | |

TABLE 1-continued

| | Sample of process material | | | |
|---|---|---|---|---|
| | Before pathogen reduction step | After pathogen reduction step | Fermented liquor | Fermented cake |
| COD, mg/L | 5,280 | 20,120 | 22,120 | |
| tVFA, mg/L | 500 | 5,500 | 6,000 | 6,500 |
| Ammonia, mg/L | 632 | 1,189 | 1,200 | 2,050 |
| *Escherichia coli*, cfu/g dry solids | $1.9 \times 10^7$ | $3.3 \times 10^2$ | | $3.5 \times 10^2$ |
| *Salmonella* Counts in 2 g | 499 | Absent | | Absent |
| PH | 5.8 | 5.5 | 5.5 | 5.8 |

EXAMPLE 2

The experiment in example 1 was repeated twice at a ferment temperature of 32° C. In the first repeat, the sample was fermented for 2 days and in the second repeat it was for 4 days. The results of the experiment are summarised in Table 2 below:

TABLE 2

| | | 2 days fermentation | | 4 days fermentation | |
|---|---|---|---|---|---|
| Determinant | Raw sludge | Cake | Liquor | Cake | Liquor |
| Dry weight, % | 6.76 | 24.05 | | 22.88 | |
| Suspended solids, mg/L | | | 950 | | 980 |
| COD, mg/L | 8,100 | | 21,200 | | 18,500 |
| tVFA, mg/L | 4,310 | 8,100 | 8,520 | 12,300 | 11,430 |
| *Escherichia coli* Cfu/g dry solids | $1.1 \times 10^6$ | $4.4 \times 10^4$ | | $2.1 \times 10^3$ | |
| Alkalinity, mg/L | 2,482 | 2392 | | 2,485 | |
| Ammonia, mg/L | 669 | 2,100 | 904 | 2,500 | 1,115 |
| PH | 5.3 | | 5.3 | | 5.2 |

EXAMPLE 3

The fermented liquor from example 1 (0.75 L total) was treated in a bench top UASB anaerobic reactor to produce methane. The results of the experiment are summarised in Table 3 below:

TABLE 3

| Digestion time (hours) | Yield of biogas (L) | Methane content (%) |
|---|---|---|
| 24 | 5.0 | 65.0 |
| 48 | 5.6 | 63.5 |

EXAMPLE 4

A fill-scale anaerobic fermenter with 6 tanks in series was operated in a continuous mode at a temperature of 42° C. The fermenter had a throughput of 150 m³/day giving a mean hydraulic retention time of 4 days. A full-scale centrifuge dewatered the output from the fermenter. The results of the experiment are summarised in Table 4 below:

TABLE 4

|  | Determinant | | | |
| --- | --- | --- | --- | --- |
|  | Raw sludge | Fermented sludge | Fermented cake | Fermented liquor |
| Dry weight, % | 6.12 | 4.32 | 20.5 |  |
| Volatile solids, % | 81.3 | 76.7 |  |  |
| Suspended solids, mg/L |  |  |  | 2,500 |
| Escherichia coli cfu/g dry solids | $2.5 \times 10^7$ | $3.4 \times 10^2$ | $4.4 \times 10^2$ |  |
| Salmonella Presence in 2 g | YES | NO | NO |  |
| PH | 6.1 | 5.5 | 6.1 | 5.8 |
| Alkalinity, mg/L | 2,280 | 2,710 |  |  |
| Ammonia, mg/L | 477 |  | 2,200 | 1,100 |
| tVFA, mg/L | 2,800 |  | 14,000 | 13,500 |
| Acetic, mg/L | 1,260 |  | 4,300 | 4,010 |
| Propionic, mg/L | 838 |  | 4,010 | 4,000 |
| I-Butyric, mg/L | 114 |  | 420 | 400 |
| N-Butyric, mg/L | 288 |  | 2,070 | 2,000 |
| I-Valeric, mg/L | 180 |  | 780 | 765 |
| N-Valeric, mg/L | 116 |  | 900 | 950 |

EXAMPLE 5

The experiment in example 1 was repeated using a pig slurry as the feed. The results of the experiment are summarised in Table 5 below:

TABLE 5

|  | Sample of process material | | | |
| --- | --- | --- | --- | --- |
|  | Before pathogen reduction step | After pathogen reduction step | Fermented liquor | Fermented cake |
| Dry weight, % | 7.5 | 7.30 |  | 24.0 |
| Suspended solids, mg/L |  |  | 900 |  |
| tVFA, mg/L | 1500 | 20,500 | 21,000 | 20,500 |
| Ammonia, mg/L | 1,030 | 2,180 | 2,200 | 2,550 |
| Escherichia coli, cfu/g dry solids | $1.9 \times 10^6$ | $1.3 \times 10^2$ |  | $2.5 \times 10^2$ |

EXAMPLE 6

The experiment in example 1 was repeated. After the pathogen reduction step, the fermented sludge was diluted with 0.5 L of the digested liquor from example 3 (i.e. having minimal biodegradable content following anaerobic digestion to produce methane) before the sample was dewatered in a bench scale centrifuge to produce a fermented cake and fermented liquor. The total volatile Fatty Acids (tVFA) recovered in the fermented liquor was 22% higher than that which resulted from example 1.

EXAMPLE 7

A fermented sludge sample (2 L) was taken from a full-scale anaerobic fermenter that operated in a manner as described in example 4. The sample was divided into sub-samples a and b. MgO powder was added to sub-sample b before both samples were dewatered. Table 6 below shows the analysis of the liquor samples.

TABLE 6

| Determinant | sub-sample a (no MgO) | sub-sample b (1 g/L MgO) |
| --- | --- | --- |
| Suspended solids, mg/L | 2,300 | 2,400 |
| PH | 6.1 | 8.2 |
| Ammonia, mg/L | 1,200 | 1,100 |
| Orthophosphate, mg/L | 180 | 8.5 |
| tVFA, mg/L | 14,000 | 13,500 |

As can be seen from the table, precipitation of the P using MgO prior to separation of the sample greatly reduces the level of orthophosphate in the liquor sample thereby providing a liquor that may be used in BNR applications such as for the removal of P from wastewater.

The following examples 8-10 show how the VFA present in the fermented waste can be oxidized to carbon dioxide to produce heat that may be used in the pathogen reduction phase.

EXAMPLE 8

Referring to FIG. 1 of the accompanying drawings, a process flow diagram is illustrated for a further method of treating biowaste according to the present invention. The process consisted of 3 fermentation vessels in series (labeled EH1, EH2 and EH3). Each vessel has a volume of 400 m³ and an operating temperature of 35° C. In operation, the sludge feed stream (stream 1) was introduced into the first vessel (EH1). The feed stream then cascaded through vessels EH2 and EH3. The fermented sludge from vessel EH3 was split 2-way with 50% of the flow going forward to a filter press (P) to provide a fermented cake stream (stream 3) and a fermented liquor stream (stream 4). The remainder of the fermented sludge from vessel EH3 was fed to an aerobic reactor (ATAD) having a volume of 800 m³, which was further supplied with an oxygen stream (stream 2). Biological activities in the ATAD reactor oxidized the VFA present in the fermented waste to carbon dioxide and heat. The heat in the ATAD reactor raised the temperature of the sludge to 55° C. The oxidized sludge stream was recycled to the first vessel (EH1) where it was blended with the sludge feed stream (stream 1).

Table 7 below shows an analysis of the relevant parameters for each of the streams. It was found that the heat content of the oxidized sludge stream was able to maintain the operating temperature of the three fermenter vessels (35° C.) without any external heat input.

TABLE 7

| Parameters | Stream 1 Feed | Stream 2 Oxygen | Stream 3 Cake | Stream 4 Filtrate |
| --- | --- | --- | --- | --- |
| Flow m³/d | 100 | 450 | 16 | 84 |
| Temperature ° C. | 15 | 15 | 35 | 35 |
| Dry weight, % | 5 |  | 25 | 0 |
| Volatile solids, % | 65 |  | 57 |  |
| tVFA, mg/L | 500 |  |  | 8,000 |

EXAMPLE 9

Figure 2:
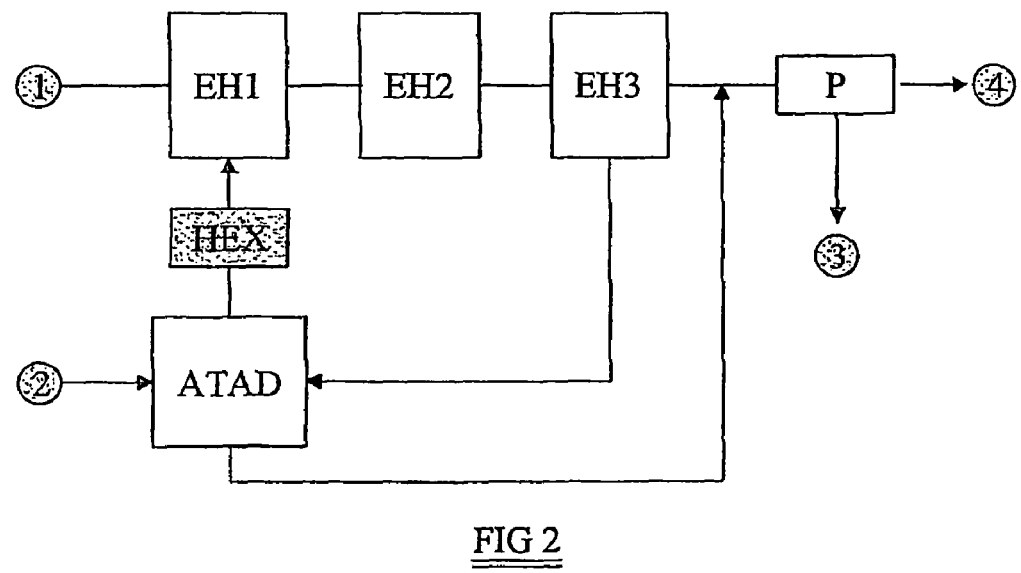
FIG. 2 is a flow diagram representation of another method of treating biowaste, according to the invention, utilizing three fermentation vessels in series.

Referring to FIG. 2, a process flow diagram of a variation of the method of Example 8 is illustrated. The process again consisted of 3 fermentation vessels in series (labeled EH1, EH2 and EH3). Each vessel has a volume of 200 m³ and an operating temperature of 35° C. In operation, the sludge feed stream (stream 1) was introduced into the first vessel (EH1).

The feed stream then cascaded through vessels EH2 and EH3. A small proportion of fermented sludge from vessel EH3 was removed and fed to an aerobic reactor (ATAD) having a volume of 50 m³, which was further supplied with an oxygen stream (stream 2). Biological activities in the ATAD reactor oxidized the VFA present in the fermented waste to carbon dioxide and heat. The heat in the ATAD reactor was removed by a heat exchanger (HEX) and recycled to the first fermentation vessel EH1. The oxidized sludge stream minus the surplus heat is combined with the remaining sludge from fermentation vessel EH3 and fed forward to a filter press (P) to provide a fermented cake stream (stream 3) and a fermented liquor stream (stream 4).

Table 8 below shows an analysis of the relevant parameters for each of the streams. It was found that the heat content of the oxidized sludge stream was able to maintain the operating temperature of the three fermenter vessels (35° C.) without any external heat input.

TABLE 8

| Parameters | Stream 1 Feed | Stream 2 Oxygen | Stream 3 Cake | Stream 4 Filtrate |
|---|---|---|---|---|
| Flow m³/d | 100 | 465 | 16 | 84 |
| Temperature ° C. | 15 | 15 | 35 | 35 |
| Dry weight, % | 5 | | 25 | 0 |
| Volatile solids, % | 65 | | 55 | |
| tVFA, mg/L | 500 | | | 12,000 |

EXAMPLE 10

Figure 3:
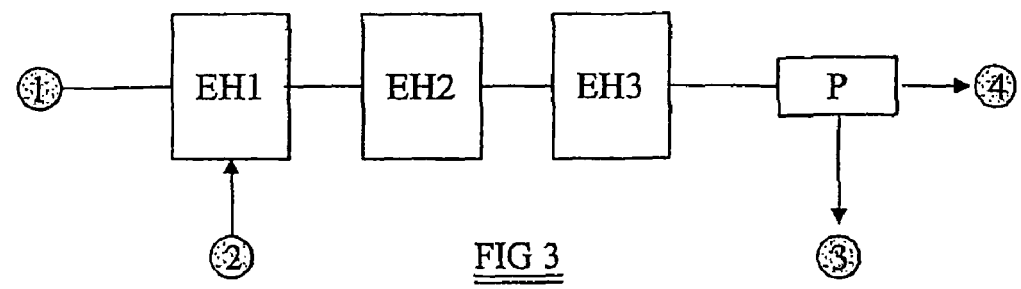
FIG. 3 is a flow diagram representation of a further method of treating biowaste, according to the invention, utilizing three fermentation vessels in series.

Referring to FIG. 3, a process flow diagram of another variation of the previous methods for treating biowaste is illustrated. The process consisted of 3 fermentation vessels in series (labeled EH1, EIH2 and EH3). Each vessel had a volume of 200 m³ and an operating temperature of 35° C. In operation, the sludge feed stream (stream 1) was introduced into the first fermentation vessel (EH1). The feed stream then cascaded through vessels EH2 and EH3. The first vessel EH1 was supplied with an oxygen stream (stream 2) for a period of up to 12 hours per day. Biological activities in the first vessel (EH1) oxidized the VFA present in the fermented waste to carbon dioxide and heat. The generated heat in the first vessel (EH) maintained its content at 35° C. Thus the first vessel EH1 acted as a fermenter part of the time and as an aerobic reactor part of the time. The fermented sludge from fermentation vessel EH3 was fed forward to a filter press (P) to provide a fermented cake stream (stream 3) and a fermented liquor stream (stream 4).

Table 9 below shows an analysis of the relevant parameters for each of the streams. It was found that the heat from the oxidation of the VFA in the first vessel EH1 was able to maintain the operating temperature of the three fermenter vessels (35° C.) without any external heat input.

TABLE 9

| Parameters | Stream 1 Feed | Stream 2 Oxygen | Stream 3 Cake | Stream 4 Filtrate |
|---|---|---|---|---|
| Flow m³/d | 100 | 450 | 16 | 84 |
| Temperature ° C. | 15 | 15 | 35 | 35 |
| Dry weight, % | 5 | | 25 | 0 |
| Volatile solids, % | 65 | | 55 | |
| tVFA, mg/L | 500 | | | 10,000 |

The invention claimed is:

1. A method of treating biowaste comprising the steps of:
   (i) fermenting the biowaste in a pathogen reduction stage under anaerobic conditions for a predetermined period between 1 and 6 days at a temperature in the mesophillic temperature range and a pH between 5.2 and 6.1; and (ii) subsequently separating solid and liquid phases to produce a fermented cake and a fermented liquor,
   wherein the fermented cake has a total Volatile Fatty Acids (tVFA) value of over 1000 mg/L with at least 15% solids on a dry basis, and the fermented liquor also has a total Volatile Fatty Acids (tVFA) value of over 1000 mg/L.

2. A method treating biowaste as claimed in claim 1 wherein the fermentation step is carried out on substantially raw, unseeded waste.

3. A method of treating biowaste as claimed in claim 1 wherein the solid level of the waste prior to fermentation is in the range 3 to 15%.

4. A method of treating biowaste as claimed in claim 1 wherein the temperature for the fermentation stage is in the range 25° C. to 46° C.

5. A method of treating biowaste as claimed in claim 4 wherein the temperature for the fermentation stage is in the range 32° C. to 42° C.

6. A method of treating biowaste as claimed in claim 1 wherein the fermentation period is between 2 and about 5 days.

7. A method of treating biowaste as claimed in claim 1 wherein the fermentation step is operated in a continuous mode using a plurality of reactors in series.

8. A method of treating biowaste as claimed in claim 1 further comprising removing a small proportion of the fermented waste during the pathogen reduction stage, adding air/oxygen to the removed waste and directing heat produced therefrom to the waste undergoing fermentation.

9. A method as claimed in claim 1 wherein oxygen or air is added at intervals to the biowaste during the fermentation step to generate heat.

10. A method of treating biowaste as claimed in claim 8 further comprising combining the oxidized fermented waste with the heat removed with other fermented waste for subsequent separation.

11. A method of treating biowaste as claimed in claim 1 wherein the step of separating the solid and liquid phases is selected from the group consisting of centrifugation, belt press and plate press.

12. A method of treating biowaste as claimed in claim 1 further comprising the step of pre-conditioning the fermented biowaste prior to the solid/liquid separation.

13. A method of treating biowaste as claimed in claim 1 further comprising the step of diluting the biowaste by a wastewater either before, during or after the pathogen reduction stage.

14. A method of treating biowaste as claimed in claim 1 further comprising the step of digesting the separated fermented liquor by anaerobic digestion methods.

15. A fermented cake produced by a method according to claim 1.

16. A fermented liquor produced by a method according to claim 1.

17. A fermented cake of biowaste origin produced by a method according to claim 1 with at least 15% solids on dry basis that contains over 500 mg/L ammonia, over 1,000 mg/L total Volatile Fatty Acids (tVFA) and *Escherichia coli* less than 100,000 cfu per g dry solids.

18. A fermented cake as claimed in claim 17 wherein the cake has at least 20% solids on a dry basis, contains over 1000 mg/L ammonia, has a tVFA content of at least 3000 mg/L and *Escherichia coil* is present in amount less than 10,000 cfu per g dry solids.

19. A fermented liquor produced by a method according to claim 1 wherein the fermented liquor contains at least 20,000 mg/L COD, at least 1500 mg/L of ammonia, has a tVFA content of at least 3000 mg/L and has a suspended solid content of less than 3000 mg/L.

* * * * *